Figure 1:
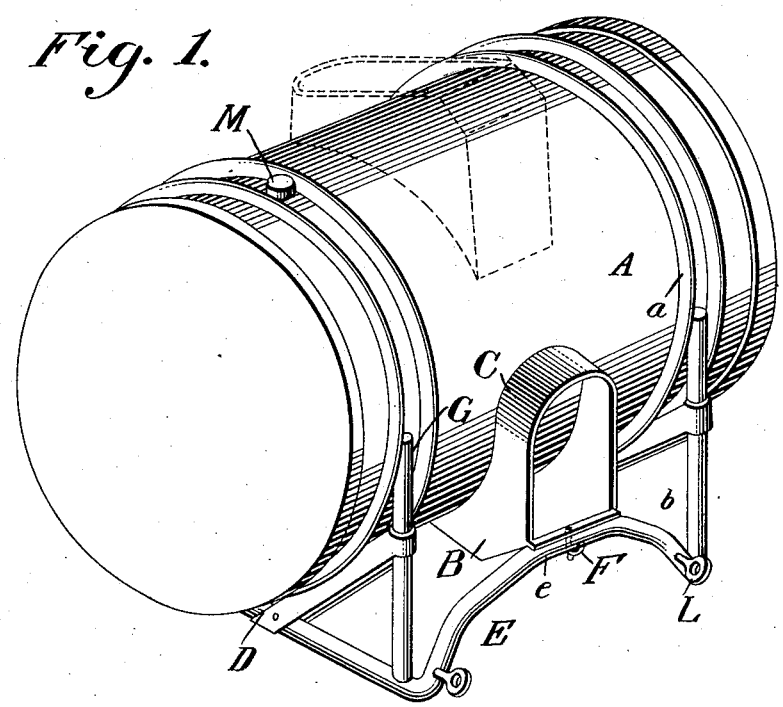

F. E. WILLIAMSON.
STOCK WATERING DEVICE.
APPLICATION FILED JULY 22, 1909.

1,016,809.

Patented Feb. 6, 1912.

Witnesses
Jos. F. Collins
L. C. Brady

Inventor
Frank E. Williamson
By J. S. Barker
his Attorney

UNITED STATES PATENT OFFICE.

FRANK E. WILLIAMSON, OF GLASCO, KANSAS.

STOCK-WATERING DEVICE.

1,016,809.  Specification of Letters Patent.  Patented Feb. 6, 1912.

Application filed July 22, 1909.  Serial No. 509,043.

*To all whom it may concern:*

Be it known that I, FRANK E. WILLIAMSON, a citizen of the United States, residing at Glasco, in the county of Cloud and State of Kansas, have invented new and useful Improvements in Stock-Watering Devices, of which the following is a specification.

My invention relates to drinking fountains especially adapted for furnishing the larger stock animals, such as hogs, with a constant supply of drinking water, delivered in a regular manner so as to avoid waste and protected from becoming fouled. Such devices must be of a size to contain a large body of water and hence when filled are very heavy, rendering it impracticable when constructed and mounted as heretofore has been customary to frequently move them from place to place, as from the place of filling to that of use, and necessitating the carrying of the water from its source of supply, as a well, to the watering device.

My present invention has for its object to provide a support or mount for a cylindrical stock watering supply vessel of large size which shall so support the vessel as to permit it to be easily turned from filling position to that of use or delivery, shall securely hold it in position for use against the actions of the stock animals which would tend to displace it, and which shall be of such nature as to be easily dragged from place to place.

In my Patent No. 950,420 dated February 22, 1910, I have disclosed a stock watering device embodying some of the features of construction embodied in the apparatus herein illustrated. In that case I disclosed a cylindrical barrel-shaped water-containing vessel supported upon its side and carrying a drinking trough which was attached to the circumference of the vessel between its ends and to which the water from the vessel was supplied, and its level controlled by atmospheric pressure, such vessel being supported upon a frame having longitudinal track pieces along which it could be rolled from a position for filling to one of supply or delivery. In my present invention I preferably employ the same form of water-containing vessel as shown in my said other case, but mounted in a shorter frame constructed to act as a cradle in which the cylindrical vessel is loosely supported, as distinguished from being mounted on pivots, and in which it may turn *in situ*, as on a stationary longitudinal axis, as distinguished from moving bodily as along longitudinal track pieces, and which frame is adapted to serve as a movable sled upon which the water vessel can be easily transported from place to place. The water device shown in this case has advantage, over the earlier device referred to, in occupying less space and in better supporting the vessel especially against the action of such vigorous animals as hogs, and in being easily movable from place to place.

Figure 2:
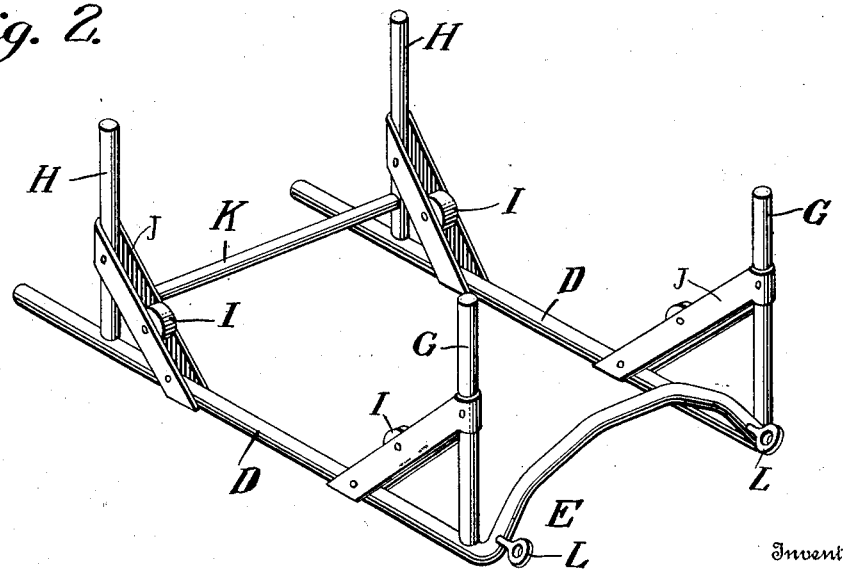

In the accompanying drawings—Figure 1 is a perspective view of a complete device embodying my present invention; and Fig. 2 is a perspective view of the cradle or support in which the water vessel is mounted.

In the drawings, A designates the water vessel which is of cylindrical form and is preferably provided with ribs $a$ forming between them grooves in which rest the bearing-pieces of the supporting frame. The vessel is provided with a drinking trough B to which the water from the vessel is supplied at a constant level in a well known manner, when the vessel is turned to the position indicated in full lines in Fig. 1. A hood C extends over the drinking trough protecting it, the hood being attached to the circumferential wall of the vessel and to the upper edges of the trough, as represented in the drawings.

The supporting frame consists of a pair of parallel longitudinal pieces D D adapted to rest upon the ground and rounded or upturned at one end of the frame so as to serve as runners for the cradle or support. These longitudinal pieces are united at their front ends by cross piece E, which may be integral with the pieces D, the cross piece being preferably extended upward toward its center where it is shaped into a substantially horizontal part $e$ adapted to constitute a rest, upon which a flange $b$ at the edge of the drinking trough may bear in order to arrest the drinking vessel in the proper position to supply the trough. A catch F may be employed to hold the vessel in this position. The frame comprises, further, the front upright pieces G G and the rear uprights H H between which the vessel A rests, these uprights preferably resting in the grooves between the ribs $a$. The vessel is supported in the frame described as in a cradle in which it may roll or turn about its central longitudinal axis without bodily or progressive movement in any direction. The supports consist preferably of rollers I I, four in number, mounted in brackets J supported in the inner angles between the longitudinal pieces D of the frame and the uprights thereof and inclined relative thereto. The rollers I are preferably arranged to rest in the grooves between the ribs a. The rear portion of the frame is strengthened and stiffened by a cross piece K.

The frame is provided at its forward end with eyes L by which a draft animal may be attached thereto in order that the frame and the vessel it carries may be dragged to and from the place of water supply, which is, on most stock farms, more or less distant from the place where the vessel is set for supplying the animals which drink therefrom.

M indicates a stop for arresting the vessel in the position it should occupy for filling. This stop preferably consists of a projection on the circumference of the vessel, preferably located in one of the grooves between the ribs a, and adapted to engage with the upper end of one of the upright pieces H when the vessel is turned into the position indicated by dotted lines in Fig. 1, where the hood C stands upright, and, with the drinking trough, constitutes a receptacle into which water may be poured and from which it will flow into the vessel, thus providing means for easily filling the latter.

It will be seen that the vessel A is loosely supported in the frame, that is, it does not have a permanent attachment thereto as by means of pivots, so that at any time it may be lifted from the frame for purposes of cleansing, repair, storage, or what not.

What I claim is:—

1. In a stock watering device, the combination of a cylindrical water-containing vessel having a drinking trough, with a supporting and transporting frame comprising parallel longitudinal pieces arranged to serve as runners, uprights between which the vessel rests, and rolling supports below the central longitudinal axis of the vessel on which the latter bears, and means for holding the vessel in position against rotation about its axis, when in feeding position.

2. In a stock-watering device, the combination of a ponderous cylindrical water-containing vessel having a drinking trough to which the water from the vessel is fed and in which it is maintained at an approximately constant level, with a frame upon which the vessel is supported on its side, the frame being provided with bearings on which the vessel rests and on which it is adapted to turn without progressive bodily movement, and with means located at the sides of the vessel for holding it upon the said bearings, the said frame being open at the top whereby the vessel may be bodily lifted therefrom, substantially as described.

FRANK E. WILLIAMSON.

Witnesses:
J. S. BARKER,
GEO. B. PITTS.